(12) United States Patent
Ellul

(10) Patent No.: US 8,076,416 B2
(45) Date of Patent: Dec. 13, 2011

(54) THERMOPLASTIC VULCANIZATES AND THEIR USE

(75) Inventor: Maria Dolores Ellul, Silver Lake Village, OH (US)

(73) Assignee: ExxonMobil Chemical Patents Inc., Houston, TX (US)

(*) Notice: Subject to any disclaimer, the term of this patent is extended or adjusted under 35 U.S.C. 154(b) by 356 days.

(21) Appl. No.: 11/051,934

(22) Filed: Feb. 4, 2005

(65) Prior Publication Data
US 2006/0178478 A1    Aug. 10, 2006

(51) Int. Cl.
C08F 8/00  (2006.01)
C08L 9/00  (2006.01)
C08L 23/04 (2006.01)
C08L 23/10 (2006.01)

(52) U.S. Cl. .................... 525/191; 525/232; 525/240

(58) Field of Classification Search .......... 525/191, 525/232, 240
See application file for complete search history.

(56) References Cited

U.S. PATENT DOCUMENTS

| | | | | |
|---|---|---|---|---|
| 4,916,198 A * | 4/1990 | Scheve et al. | ................ | 526/351 |
| 5,047,446 A | 9/1991 | DeNicola, Jr. | ................ | 522/157 |
| 5,047,485 A | 9/1991 | DeNicola, Jr. | ................ | 525/387 |
| 5,414,027 A | 5/1995 | DeNicola, Jr. et al. | ....... | 522/122 |
| 5,570,595 A | 11/1996 | Alberto | ............................ | 68/5 E |
| 5,786,403 A * | 7/1998 | Okada et al. | ................ | 521/134 |
| 6,433,090 B1 * | 8/2002 | Ellul et al. | .................... | 525/191 |
| 6,503,985 B1 | 1/2003 | Ellul et al. | .................... | 525/191 |
| 6,780,936 B1 | 8/2004 | Agarwal et al. | ............... | 525/191 |

FOREIGN PATENT DOCUMENTS

| | | |
|---|---|---|
| EP | 0 190 889 | 4/1993 |
| EP | 0 384 431 | 11/1994 |
| EP | 0 351 866 | 1/1997 |
| EP | 0 634 441 | 5/1998 |
| EP | 0 669 347 | 5/1998 |
| EP | 0 794 226 | 7/1999 |
| WO | 02/059194 | 8/2002 |
| WO | 03/082971 | 10/2003 |

OTHER PUBLICATIONS

Developments in High Melt Strength PP: Technology, Properties, Applications and Markets, Manfred Ratzsch et al., Antec 1999 New York.
Shroff R N et al: "Long-chain-branching index for essentially linear polyethylenes" Macromolecules, AC, Washington, DC, US, vol. 32, No. 25 1999, pp. 8454-8464, XP002298738. ISSN: 0024-9297.
Sherwood Technologies, "A Technical Minute, Let's Thermoform Polypropylene," Thermoforming Technical Article (1995), pp. 1-8, downloaded from http://www.foamandform.com/minutes/polypropylene.php Oct. 5, 2010.
Naguib et al., "Fundamental Foaming Mechnanisms Governing the Volume Expansion of Extruded Polypropylene Foams," Journal of Applied Polymer Science, vol. 91 (2004), pp. 2661-2668.

* cited by examiner

Primary Examiner — Nathan M Nutter

(57) ABSTRACT

A thermoplastic vulcanizate comprising a dynamically cured rubber, and from about 20 to about 400 parts by weight of a thermoplastic resin per 100 parts by weight rubber, where said thermoplastic resin includes at least 0.1 percent by weight and less than 5.0 percent by weight, based upon the entire weight of said thermoplastic resin, of a long-chain branched polyolefin, with the remainder of said thermoplastic resin including a non-long-chain branched thermoplastic resin, where said long-chain branched polyolefin includes one or more polymers or copolymers having a viscosity average branching index $<gN>_{vis}$ of less than 0.9 and deriving from monomer selected from the group consisting of ethylene and mono-α-olefins, and where said non-long-chain thermoplastic resin includes one or more polymers or copolymers having a viscosity average branching index $<gN>_{vis}$ of 0.9 or more.

16 Claims, No Drawings

THERMOPLASTIC VULCANIZATES AND THEIR USE

FIELD OF THE INVENTION

This invention relates to thermoplastic vulcanizates that include long-chain branched polyolefins.

BACKGROUND OF THE INVENTION

Thermoplastics are often thermoformed by employing injection molding and blow molding techniques. Within these thermoforming operations, efficacy is often measured by cycle time, which may generally be referred to as the time required to manufacture a given part. A decreased cycle time is often advantageous inasmuch as a greater number of parts can be manufactured per unit time.

A factor often limiting cycle time is the characteristics of the thermoplastic material that is being thermoformed. In particular, the amount of time required for the thermoplastic material to cool from its melting temperature ($T_m$) to its crystallization temperature ($T_c$) is often the limiting step in the manufacturing process.

Attempts have been made to improve the rate of crystallization of thermoplastic resins used in thermoforming processes. For example, constituents that can act as a crystallization agent are often added to the thermoplastic resin. For example, U.S. Pat. No. 6,780,936 teaches diene-olefin copolymer nucleating agents that are advantageous in increasing the crystallization temperature of certain polyolefins. These copolymers derive from the copolymerization of α,ω-dienes and olefins by employing supported single-site catalyst systems.

The use of crystallization agents or nucleating agents can, however, have a deleterious impact on other features or properties of the thermoplastic resin.

Thermoplastic vulcanizates can advantageously be thermoformed. Because thermoplastic vulcanizates have many technologically useful features, they are often thermoformed into parts or articles where superior engineering properties are required. Therefore, any deleterious impact that may be imparted by a crystallization agent can often not be tolerated. Nonetheless, efficiencies in the thermoforming processes of thermoplastic vulcanizates are continually sought.

Copolymers of olefin and α,ω-dienes have been added to thermoplastic vulcanizates as disclosed in U.S. Pat. No. 6,433,090. These copolymers of olefins and α,ω-dienes, which are characterized by long-chain branches, are added in an amount from about 5 to about 75% by weight of the thermoplastic component of the thermoplastic vulcanizate in order to provide compositions that can be foamed into cellular materials that exhibit improved properties such as compression set and compression load deflection.

There is therefore a continued desire to improve the rate of crystallization of thermoplastic vulcanizates in order to enhance the thermoforming operations thereof without deleteriously impacting the other properties of the thermoplastic vulcanizate or thermoformed parts or articles thereof.

SUMMARY OF THE INVENTION

In general the present invention provides a thermoplastic elastomer composition comprising a thermoplastic vulcanizates including (i) a cured rubber, and (ii) from about 20 to about 400 parts by weight of a thermoplastic resin component per 100 parts by weight rubber, where said thermoplastic resin component includes at least 0.1 percent by weight and less than 5.0 percent by weight, based upon the entire weight of said thermoplastic resin, of a high-viscosity, long-chain branched polyolefin characterized by a melt flow rate of less than 10 dg/min, an $M_w$ in excess of 300,000, an $M_z$ in excess of 700,000, $M_w/M_n$ in excess of 4.0, and an $M_z/M_w$ in excess of 2.5.

The present invention also provides a method of thermoforming an article, the method comprising providing a thermoplastic vulcanizate, heating the thermoplastic vulcanizate to a temperature at or above the melt temperature of the thermoplastic vulcanizate to provide a melt, forming the melt within a mold to form a molded article, allowing the molded article to cool to a temperature at or below the crystallization temperature of the thermoplastic vulcanizates, and releasing the molded article from the mold, where the thermoplastic vulcanizate includes (i) a cured rubber, and (ii) from about 20 to about 400 parts by weight of a thermoplastic resin component per 100 parts by weight rubber, where said thermoplastic resin component includes at least 0.1 percent by weight and less than 5.0 percent by weight, based upon the entire weight of said thermoplastic resin, of a high-viscosity, long-chain branched polyolefin characterized by a melt flow rate of less than 10 dg/min, an $M_w$ in excess of 300,000, an $M_z$ in excess of 700,000, $M_w/M_n$ in excess of 4.0, and an $M_z/M_w$ in excess of 2.5.

DETAILED DESCRIPTION OF ILLUSTRATIVE EMBODIMENTS

One or more embodiments of this invention are directed to thermoplastic elastomer compositions. These compositions include thermoplastic vulcanizates, which include a thermoplastic component that includes a small portion of a high viscosity, long-chain branched polyolefin. The presence of this small amount of high viscosity, long-chain branched polyolefin unexpectedly increases the crystallization temperature of the thermoplastic vulcanizate—without having a deleterious impact on other aspects of the thermoplastic vulcanizate—and thereby increases the desirability of the thermoplastic vulcanizate for, among other things, thermoforming procedures.

In one or more embodiments, the thermoplastic vulcanizates of this invention include a dynamically-cured rubber, a thermoplastic component or phase that includes (i) a long-chain branched polyolefin, and (ii) a thermoplastic resin that is a non-long-chain branched polyolefin. Other optional ingredients include processing additives, oils, fillers, and other ingredients that are conventionally included in thermoplastic vulcanizates.

Any rubber or mixture thereof that is capable of being dynamically cured may be used. Reference to a rubber may include mixtures of more than one rubber. Non-limiting examples of useful rubbers include olefinic elastomeric copolymers, natural rubber, styrene-butadiene copolymer rubber, butadiene rubber, butyl rubber, acrylonitrile rubber, butadiene-styrene-vinyl pyridine rubber, urethane rubber, and polyisoprene rubber.

The term olefinic elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6- octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used.

In one or more embodiments, the olefinic elastomeric copolymers include from about 12 to about 85% by weight, or from about 55 to about 75% by weight, or from about 60 to about 70% by weight, and or from about 61 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units (such as propylene) deriving from α-olefin monomer. Expressed in mole percent, the terpolymer of one embodiment includes from about 0.1 to about 5 mole percent, or from about 0.5 to about 4 mole percent, or from about 1 to about 2.5 mole percent diene units deriving from diene monomer.

In one or more embodiments, useful olefinic elastomeric copolymers have a weight average molecular weight ($M_w$) that is greater than 50,000, in other embodiments greater than 100,000, in other embodiments greater than 200,000, and in other embodiments greater than 300,000; and the weight average molecular weight of the preferred olefinic elastomeric copolymers of one embodiment is less than 1,200,000, in other embodiments less than 1,000,000, in other embodiments less than 900,000, and in other embodiments less than 800,000. In one or more embodiments, useful olefinic elastomeric copolymers have a number average molecular weight ($M_n$) that greater than 20,000, in other embodiments greater than 60,000, in other embodiments greater than 100,000, and in other embodiments greater than 150,000; and the number average molecular weight of the olefinic elastomeric copolymers of one or more embodiments is less than 500,000, in other embodiments less than 400,000, in other embodiments less than 300,000, and in other embodiments less than 250,000.

In one or more embodiments, useful olefinic elastomeric copolymers may also be characterized by having a Mooney viscosity ($ML_{(1+4)}$ at 125° C.) per ASTM D 1646, of from about 50 to about 500 or from about 75 to about 450. Where higher molecular weight olefinic elastomeric copolymers are employed within the thermoplastic vulcanizates of this invention, these high molecular weight polymers may be obtained in an oil-extended form. These oil-extended copolymers typically include from about 15 to about 100 parts by weight, per 100 parts by weight rubber, of a paraffinic oil. The Mooney viscosity of these oil-extended copolymers may be from about 45 to about 80 or from about 50 to about 70.

In one or more embodiments, useful olefinic elastomeric copolymers may be characterized by having an inherent viscosity, as measured in Decalin at 135° C., up from about 2 to about 8 dl/g, or from about 3 to about 7 dl/g, or from about 4 to about 6.5 dl/g.

Useful olefinic elastomeric copolymers may be manufactured or synthesized by using a variety of techniques. For example, these copolymers can be synthesized by employing solution, slurry, or gas phase polymerization techniques that employ numerous catalyst systems including Ziegler-Natta systems, single-site catalysts including vanadium catalysts and Group IV-VI metallocenes, and Brookhart catalysts. Elastomeric copolymers are commercially available under the tradenames Vistalon™ (ExxonMobil Chemical Co.; Houston, Tex.), VISTAMAXX™ (ExxonMobil), Keltan™ (DSM Copolymers; Baton Rouge, La.), Nordel™ IP (DuPont Dow Elastomers; Wilmington, Del.), NORDEL MG™ (DuPont Dow Elastomers), Royalene™ (Crompton) and Buna™ (Bayer Corp.; Germany).

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinyl styrene. Exemplary alkyl substituted vinyl aromatic monomers include α-methyl styrene and paramethyl styrene. These copolymers and terpolymers may also be halogenated such as in the case of chlorinated and brominated butyl rubber.

In one or more embodiments, butyl rubber includes copolymers of isobutylene and isoprene, copolymers of isobutylene and paramethyl styrene, as described in U.S. Pat. No. 5,013,793, which is incorporated herein by reference for purpose of U.S. patent practice, terpolymers of isobutylene, isoprene, and divinyl styrene, as described in U.S. Pat. No. 4,916,180, which is incorporated herein by reference for purpose of U.S. patent practice, and star branched butyl rubber, as described in U.S. Pat. No. 6,255,389, which is incorporated herein by reference for purpose of U.S. patent practice. These preferred copolymers and terpolymers may be halogenated.

In one embodiment, where butyl rubber includes the isobutylene-isoprene copolymer, the copolymer may include from about 0.5 to about 30, or from about 0.8 to about 5, percent by weight isoprene based on the entire weight of the copolymer with the remainder being isobutylene.

In another embodiment, where butyl rubber includes isobutylene-paramethyl styrene copolymer, the copolymer may include from about 0.5 to about 25, and from about 2 to about 20, percent by weight paramethyl styrene based on the entire weight of the copolymer with the remainder being isobutylene. In one embodiment, isobutylene-paramethyl styrene copolymers can be halogenated, such as with bromine, and these halogenated copolymers can contain from about 0 to about 10 percent by weight, or from about 0.3 to about 7 percent by weight halogenation.

In other embodiments, where butyl rubber includes isobutylene-isoprene-divinyl styrene, the terpolymer may include from about 95 to about 99, or from about 96 to about 98.5, percent by weight isobutylene, and from about 0.5 to about 5, or from about 0.8 to about 2.5, percent by weight isoprene based on the entire weight of the terpolymer, with the balance being divinyl styrene.

In the case of halogenated butyl rubbers, the butyl rubber may include from about 0.1 to about 10, or from about 0.3 to about 7, or from about 0.5 to about 3 percent by weight halogen based upon the entire weight of the copolymer or terpolymer.

In one or more embodiments, the glass transition temperature (Tg) of useful butyl rubber can be less than about −55° C., or less than about −58° C., or less than about −60° C., or less than about −63° C.

In one or more embodiments, the Mooney viscosity ($ML_{1+8}$@125° C.) of useful butyl rubber can be from about 25 to about 75, or from about 30 to about 60, or from about 40 to about 55.

Useful butyl rubber includes that prepared by polymerization at low temperature in the presence of a Friedel-Crafts catalyst as disclosed within U.S. Pat. Nos. 2,356,128 and 2,944,576. Other methods may also be employed.

Butyl rubber can be obtained from a number of commercial sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and param-ethyl styrene are available under the tradename EXXPRO™ (ExxonMobil Chemical Co.), and star branched butyl rubbers are available under the tradename STAR BRANCHED BUTYL™ (ExxonMobil Chemical Co.). Halogenated and non-halogenated terpolymers of isobutylene, isoprene, and divinyl styrene are available under the tradename Polysar Butyl™ (Bayer; Germany).

The rubber may be partially of fully cured or crosslinked. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber has a degree of cure where not more than 15 weight percent, in other embodiments not more than 10 weight percent, in other embodiments not more than 5 weight percent, and in other embodiments not more than 3 weight percent is extractable by cyclohexane at 23° C. as described in U.S. Pat. Nos. 5,100,947 and 5,157,081, which are incorporated herein by reference for purpose of U.S. patent practice. Alternatively, in one or more embodiments, the rubber has a degree of cure such that the crosslink density is preferably at least $4 \times 10^{-5}$, in other embodiments at least $7 \times 10^{-5}$, and in other embodiments at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol 68, pp. 573-584 (1995).

The rubber can be cured by employing a variety of curatives. Exemplary curatives include phenolic resin cure systems, peroxide cure systems, and silicon-containing cure systems.

In one or more embodiments, the phenolic resins include those disclosed in U.S. Pat. Nos. 2,972,600, 3,287,440, 5,952,425 and 6,437,030, and International Application No. PCT/US04/30518, which are incorporated herein by reference for purpose of U.S. patent practice.

Phenolic resin curatives can be referred to as resole resins, and include those resins made by the condensation of alkyl substituted phenols or unsubstituted phenols with aldehydes, such as formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend may include from about 25 to about 40% by weight octyl phenol and from about 75 to about 60% by weight nonylphenol (optionally from about 30 to about 35 weight percent octyl phenol and from about 70 to about 65 weight percent nonylphenol). In one embodiment, the blend includes about 33% by weight octylphenol-formaldehyde and about 67% by weight nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which are referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

In one or more embodiments, the phenolic resin can be used in combination with the halogen source, such as stannous chloride, and a metal oxide or reducing compound such as zinc oxide.

In one ore more embodiments, useful peroxide curatives include organic peroxides. Examples of organic peroxides include, but are not limited to, di-tert-butyl peroxide, dicumyl peroxide, t-butylcumyl peroxide, $\alpha,\alpha$-bis(tert-butylperoxy) diisopropyl benzene, 2,5-dimethyl-2,5-di(t-butylperoxy) hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Useful peroxides and their methods of use in dynamic vulcanization of thermoplastic vulcanizates are disclosed in U.S. Pat. No. 5,656,693, which is incorporated herein by reference for purpose of U.S. patent practice.

In one or more embodiments, the peroxide curatives are employed in conjunction with a coagent. Examples of coagents include triallylcyanurate, triallyl isocyanurate, triallyl phosphate, sulfur, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime. In order to maximize the efficiency of peroxide/coagent crosslinking the mixing and dynamic vulcanization are preferably carried out in a nitrogen atmosphere.

In one or more embodiments, useful silicon-containing cure systems include silicon hydride compounds having at least two SiH groups. It is believed that these compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Useful catalysts for hydrosilation include, but are not limited to, peroxide catalysts and catalysts including transition metals of Group VIII. These metals include, but are not limited to, palladium, rhodium, and platinum, as well as complexes of these metals. For a further discussion of the use of hydrosilation to cure thermoplastic vulcanizates, reference can be made to U.S. Pat. No. 5,936,028, which is incorporated herein by reference for purpose of U.S. patent practice. In one or more embodiments, a silicon-containing curative can be employed to cure an elastomeric copolymer including units deriving from 5-vinyl-2-norbornene.

In one or more embodiments, curatives that are useful for curing butyl rubber include those described in U.S. Pat. Nos. 5,013,793, 5,100,947, 5,021,500, 4,978,714, and 4,810,752, which are incorporated herein by reference for purpose of U.S. patent practice.

The thermoplastic component or thermoplastic phase of the thermoplastic vulcanizates of this invention include (i) a high viscosity, long-chain branched polyolefin and (ii) at least one other thermoplastic resin.

In one or more embodiments, the high viscosity, long-chain branched polyolefin is characterized by a melt flow rate of less than 10 dg/min, a weight average molecular weight ($M_w$) in excess of 300,000, a Z-average molecular weight ($M_z$) in excess of 700,000, an $M_w/M_n$ in excess of 4.0, and an $M_z/M_w$ in excess of 2.5.

In one or more embodiments, the high viscosity, long-chain branched polyolefins may be characterized by a melt flow rate that is less than about 8 dg/min, in other embodiments less than 5 dg/min, in other embodiments less than 2, and in other embodiments less than 1 dg/min, as determined by ASTM D-1238 at 230° C. and 2.16 kg load.

In one or more embodiments, the high viscosity, long-chain branched polyolefins can be characterized by a weight average molecular weight ($M_w$) in excess of 350,000, in other embodiments in excess of 375,000, and in other embodiments in excess of 400,000. These high viscosity, long-chain branched polyolefins may also be characterized by an $M_w$ that is less than 600,000, in other embodiments less than 500,000, and in other embodiments less than 450,000.

In one or more embodiments, the high viscosity, long-chain branched polyolefins may be characterized by a Z-average molecular weight ($M_z$) that is in excess of 800,000, in other embodiments in excess of 1,000,000, and in other embodiments in excess of 1,100,000. These polyolefins may also be characterized by an $M_z$ that is less than 2,000,000, in other embodiments less than 1,500,000, in other embodiments less than 1,300,000.

In one or more embodiments, the high viscosity, long-chain branched polyolefin may be characterized by a number average molecular weight ($M_n$) that is in excess of 40,000, in other embodiments in excess of 50,000, and in other embodiments in excess of 60,000. These polyolefins may be characterized by an $M_n$ that is less than 200,000, in other embodiments less than 150,000, and in other embodiments less than 120,000. The molecular weight refers to $M_w$, $M_n$, and $M_z$ as determined by gel permeation chromatography with polystyrene and/or polyethylene standards with the polymer dissolved in 1,2,4-trichlorobenzene at 145° C. Similar methods are disclosed in U.S. Pat. No. 4,540,753, which is incorporated herein by reference for U.S. patent practice.

In one or more embodiments, the high viscosity, long-chain branched polyolefins are characterized by $M_w/M_n$ that is in excess of 4.5, in other embodiments in excess of 5.0, and in other embodiments in excess of 5.5. In one or more embodiments, the high viscosity, long-chain branched polyolefins may be characterized by an $M_z/M_w$ in excess of 2.7, in other embodiments in excess of 3.0, and in other embodiments in excess of 3.3.

In one or more embodiments, the high viscosity, long-chain branched polyolefins may also be characterized by a viscosity average branching index of less than 0.9, in other embodiments less than 0.7, and in other embodiments less than 0.5.

The branching index, gN, at a given molecular weight is determined according to the formula $g'=[\eta]_{branched}/[\eta]_{linear}$, where $[\eta]_{branched}$ is the viscosity of the branched polymer at a given molecular weight slice, i, and $[\eta]_{linear}$ is the viscosity of the known linear reference polymer at the given molecular weight slice.

The viscosity average branching index ($<g'>_{vis}$) of the entire polymer may be obtained from the following equation:

$$<g'>_{vis} = \frac{\sum_{i=1}^{N} C_i [\eta]_i}{\sum_{i=1}^{N} C_i [KM_i^\alpha]}$$

where Mi is the molecular weight of the polymer, $[\eta]_i$ is the intrinsic viscosity of the branched polymer at molecular weight Mi, $C_i$ is the concentration of the polymer at molecular weight Mi, and K and α are measured constants from a linear polymer as described by Paul J. Flory at page 310 of PRINCIPLES OF POLYMER CHEMISTRY (1953), and the summation is over all the slices in the distribution. The $<g'>_{vis}$ values are obtained by gel permeation chromatography (GPC) while the polymer is in dilute solution within 1,2,4 trichlorobenzene. The GPC is equipped with triple detectors; differential refractive index (DRI), light scattering and viscosity. The DRI is calibrated with both polystyrene and low molecular weight polyethylene standards, the light scattering detector with a series of polymers of known molecular weight, and the differential viscometer with a series of polymers of known intrinsic viscosities.

For purposes of defining the high viscosity, long-chain branched polyolefins of one or more embodiments of this invention, $<g>_w$ and $<g>_z$ can likewise be employed. $<g>_w$ may be obtained from the following equation:

$$<g>_w = \frac{\sum C_i R_{g_i}^2}{\sum C_i [KM_i^\alpha]^2}$$

where $M_i$ is the molecular weight of the polymer, $C_i$ is the concentration of the polymer at molecular weight $M_i$, $R_{g_i}$ is the radius of gyration of the branched polymer at molecular weight $M_i$, and K and α are measured constants from a linear polymer as described by Paul J. Flory at page 310 of PRINCIPLES OF POLYMER CHEMISTRY (1953), and the summation is over all the slices in the distribution.

Further, $<g>_z$ of the entire polymer may be obtained from the following equation:

$$<g>_z = \frac{\sum C_i M_i R_{g_i}^2}{\sum C_i M_i [KM_i^\alpha]^2}$$

where the variables $M_i$, $C_i$, $R_{g_i}$, K and α are as described above. $<g>_w$ and $<g>_z$ can be determined by using GPC MALLS (Multiple Angle Laser Light Scattering).

In one or more embodiments, the high viscosity, long-chain branched polyolefins may have a melt temperature ($T_m$) that is greater than 120° C., in other embodiments greater than 140° C., and in other embodiments greater than 155° C., with a range of 120° C. to about 200° C. In one or more embodiments, the high viscosity, long-chain branched polyolefins may have a crystallization temperature ($T_c$) that is greater than about 90° C., in other embodiments greater than about 100, and in other embodiments greater than about 120° C., with a range of about 90° C. to about 140° C. In one or more embodiments, the high viscosity, long-chain branched polyolefins may have a glass transition temperature ($T_g$) that is less than 10° C., in other embodiments less than 5° C., and in other embodiments less than 0° C., within a range of about −120° C. to about 10° C.

In one or more embodiments, high viscosity, long-chain branched polyolefins include homopolymers of ethylene or α-olefins, as well as copolymers of two or more α-olefins, or copolymers of one or more α-olefins with ethylene. In certain embodiments, the α-olefins include propylene, 1-butene, 1-hexene, 1-octene, 2-methyl-1-propene, 3-methyl-1-pentene, 4-methyl-1-pentene, 5-methyl-hexene, and mixtures thereof; these α-olefins may be referred to as mono-α-olefins inasmuch as they include only one polymerizable double bond. Specifically included are polypropylene homopolymers. In one or more embodiments, the mer units of the high viscosity, long-chain branched polyolefins that derive from α,ω-dienes are limited. In one or more embodiments, the high viscosity, long-chain branched polyolefins includes less than 0.001, in other embodiments less than 0.0005, and in other embodiments less than 0.0001 percent by weight units deriving from α,ω-dienes. In one or more embodiments, the high viscosity, long-chain branched polyolefins include those polymers and copolymers that are devoid of α,ω-diene units; i.e., polymers and copolymers prepared by polymerizing α,ω-diene monomer are specifically excluded.

In one or more embodiments, the high viscosity, long-chain branched polyolefins employed in this invention are prepared by converting solid, high molecular weight, linear, propylene polymer material with irradiating energy as disclosed in U.S. Pat. No. 5,414,027, which is incorporated herein by reference for purpose of U.S. patent practice. Other techniques include treatment of linear polymer with heat and peroxide as disclosed in U.S. Pat. No. 5,047,485, which is incorporated herein by reference for purpose of U.S. patent practice. Other useful high viscosity, long-chain branched polyolefins are disclosed in U.S. Pat. Nos. 4,916,198, 5,047,446, 5,570,595, and European Publication Nos. 0 190 889, 0 384 431, 0 351 866, and 0 634 441, which are also incorporated herein by reference for purpose of U.S. patent practice.

The other thermoplastic resins that are included in the thermoplastic component or thermoplastic phase of the thermoplastic vulcanizates of this invention include those thermoplastic resins that are not high viscosity, long-chain branched polymers as defined herein. In one or more embodiments, these thermoplastic resins have a viscosity average branching index of greater than 0.90, in other embodiments greater than 0.95, in other embodiments greater that 0.99, and in other embodiments equal to 1.0. In one embodiment, the non-long-chain branched thermoplastic resin is a linear polyolefin.

In one or more embodiments, these thermoplastic resins may be characterized by an $M_w$ of from about 200,000 to about 2,000,000 and in other embodiments from about 300,000 to about 600,000. They are also characterized by an $M_n$ of about 80,000 to about 800,000, and in other embodiments about 90,000 to about 150,000.

In on or more embodiments these thermoplastic resins have a viscosity average branching index greater than 0.90, in other embodiments greater than 0.95, in other embodiments greater than 0.99, and in other embodiments equal to 1.0. In one embodiment, the non-long-chain branched thermoplastic resin is a linear polyolefin.

In one or more embodiments, these thermoplastic resins can have a melt flow rate that is less than about 10 dg/min, optionally less than about 2 dg/min, optionally less than about 1.0 dg/min, and optionally less than about 0.5 dg/min, per ASTM D-1238 at 230° C. and 2.16 kg load.

In one ore more embodiments, these thermoplastic resins also can have a melt temperature ($T_m$) that is from about 150° C. to about 250° C., optionally from about 155 to about 170° C., and optionally from about 160° C. to about 165° C. They may have a glass transition temperature ($T_g$) of from about −10 to about 10° C., optionally from about −3 to about 5° C., and optionally from about 0 to about 2° C. They may have a crystallization temperature ($T_c$) of these resins is optionally at least about 75° C., optionally at least about 95° C., optionally at least about 100° C., and optionally at least 105° C., with one embodiment ranging from 105° to 115° C.

Also, these thermoplastic resins may be characterized by having a heat of fusion of at least 25 J/g, optionally in excess of 50 J/g, optionally in excess of 75 J/g, and optionally in excess of 95 J/g.

Exemplary thermoplastic resins include crystalline and crystallizable polyolefins. Also, the thermoplastic resins may include copolymers of polyolefins with styrene such as styrene-ethylene copolymer. In one embodiment, the thermoplastic resins are formed by polymerizing ethylene or α-olefins such as propylene, 1-butene, 1-hexene, 1-octene, 2-methyl-1-propene, 3-methyl-1-pentene, 4-methyl-1-pentene, s-methyl-1-hexene, and mixtures thereof. Copolymers of ethylene and propylene and ethylene and propylene with another α-olefin such as 1-butene, 1-hexene, 1-octene, 2-methyl-1-propene, 3-methyl-1-pentene, 4-methyl-1-pentene, s-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers will typically be from 1 to about 30% by weight of the polymer, for example, See U.S. Pat. Nos. 6,268,438, 6,288,171, and 6,245,856. Copolymers available under the tradename VISTAMAXX™ (ExxonMobil) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one embodiment, the thermoplastic resin used in conjunction with the high viscosity, long-chain branched polyolefins includes a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate can be employed. These polypropylene resins are characterized by a melt flow rate that is less than or equal to 10 dg/min, optionally less than or equal to 1.0 dg/min, and optionally less than or equal to 0.5 dg/min per ASTM D-1238 at 2.16 kg load.

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915, which is incorporated herein by reference for purpose of U.S. patent practice.

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, optionally at least about 35 percent by weight, optionally at least about 45 percent by weight, and optionally at least about 50 percent by weight rubber. In one ore more embodiments, the amount of rubber within the thermoplastic vulcanizates can be from about 15 to about go percent by weight, optionally from about 45 to about 85 percent by weight, and optionally from about 60 to about 80 percent by weight, based on the entire weight of the rubber and thermoplastic component combined, where the thermoplastic component includes the high viscosity, long-chain branched polyolefin and the at least one other thermoplastic resin.

The thermoplastic component of the thermoplastic vulcanizates of this invention includes the high viscosity, long-chain branched polyolefin and at least one other thermoplastic resin. In one or more embodiments, the thermoplastic vulcanizates may comprise from about 10 to about 85 percent by weight, or from about 15 to about 70 percent by weight, or from about 20 to about 50 percent by weight of the thermoplastic component based upon the entire weight of the rubber and thermoplastic component combined. The amount of the thermoplastic component can also be expressed with respect to the amount of the rubber component. In one embodiment, the thermoplastic vulcanizates may comprise from about 20 to about 400, or from about 40 to about 300, or from about 80 to about 200 parts by weight thermoplastic resin per 100 parts by weight rubber.

The thermoplastic component includes at least 0.1 percent by weight, in other embodiments at least 0.25 percent by weight, in other embodiments at least 0.5 percent by weight, and in other embodiments at least 1.0 percent by weight of the high viscosity, long-chain branched polyolefin with the remainder including the at least one other thermoplastic resin. On the other hand, the thermoplastic component includes less than 5.0 percent by weight, in other embodiments less than 4.75 percent by weight, in other embodiments less than 4.5 percent by weight, and in other embodiments less than 4.0 percent by weight of the high viscosity, long-chain branched polyolefin, with the remainder of the thermoplastic component including the at least one other thermoplastic resin.

When employed, the thermoplastic vulcanizates may include from about 0 to about 20 parts by weight, or from about 1 to about 10 parts by weight, or from about 2 to about 6 parts by weight of a polymeric processing additive per 100 parts by weight rubber.

Fillers, such as carbon black or clay, may be added in amount from about 10 to about 250, per 100 parts by weight of rubber. The amount of carbon black that can be used depends, at least in part, upon the type of carbon black and the amount of extender oil that is used.

Generally, from about 5 to about 300 parts by weight, or from about 30 to about 250 parts by weight, or from about 70 to about 200 parts by weight, of extender oil per 100 parts rubber can be added. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable. Where ester plasticizers are employed, they are generally used in amounts less than about 250 parts, or less than about 175 parts, per 100 parts rubber.

In one or more embodiments, the rubber is cured or crosslinked by dynamic vulcanization. The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic. Dynamic vulcanization can occur in the presence of the long-chain branched polyolefin, or the long-chain branched polyolefin can be added after dynamic vulcanization (i.e., post added), or both (i.e., some can be added prior to dynamic vulcanization and some can be added after dynamic vulcanization). The increase in crystallization temperature of the thermoplastic vulcanizate of one or more embodiments of this invention can be advantageously increased when dynamic vulcanization occurs in the presence of the high viscosity, long-chain branched polyolefin.

In one embodiment, the rubber can be simultaneously crosslinked and dispersed as fine particles within the thermoplastic matrix, although other morphologies may also exist. Dynamic vulcanization can be effected by mixing the thermoplastic elastomer components at elevated temperature in conventional mixing equipment such as roll mills, stabilizers, Banbury mixers, Brabender mixers, continuous mixers, mixing extruders and the like. Methods for preparing thermoplastic vulcanizates is described in U.S. Pat. Nos. 4,311,628 and 4,594,390, which are incorporated herein by reference for purpose of U.S. patent practice, although methods employing low shear rates can also be used. Multiple step processes can also be employed whereby ingredients such as plastics, oils, and scavengers can be added after dynamic vulcanization has been achieved as disclosed in International Application No. PCT/US04/30517, which is incorporated herein by reference for purpose of U.S. patent practice.

The skilled artisan will be able to readily determine a sufficient or effective amount of vulcanizing agent to be employed without undue calculation or experimentation.

For example, a phenolic resin can be employed in an amount of about 2 to about 10, optionally about 3.5 to about 7.5, and optionally about 5 to about 6, parts by weight per 100 parts by weight rubber. In one or more embodiments, the phenolic resin can be employed in conjunction with stannous chloride and optionally zinc oxide. The stannous chloride can be employed in an amount from about 0.2 to about 10, optionally from about 0.3 to about 5, and optionally from about 0.5 to about 3, parts by weight per 100 parts by weight rubber. The zinc oxide can be employed in an amount from about 0.25 to about 5, optionally from about 0.5 to about 3, and optionally from about 1 to about 2, parts by weight per 100 parts by weight rubber.

Alternatively, a peroxide can be employed in an amount from about $1 \times 10^{-5}$ moles to about $1 \times 10^{-1}$ moles, optionally from about $1 \times 10^{-4}$ moles to about $9 \times 10^{-2}$ moles, and optionally from about $1 \times 10^{-2}$ moles to about $4 \times 10^{-2}$ moles per 100 parts by weight rubber. The amount may also be expressed as a weight per 100 parts by weight rubber. This amount, however, may vary depending on the curative employed. For example, where 4,4-bis(tert-butyl peroxy) diisopropyl benzene is employed, the amount employed may include from about 0.5 to about 12 and optionally from about 1 to about 6 parts by weight per 100 parts by weight rubber. The skilled artisan will be able to readily determine a sufficient or effective amount of coagent that can be used with the peroxide without undue calculation or experimentation. In one or more embodiments, the amount of coagent employed is similar in terms of moles to the number of moles of curative employed. The amount of coagent may also be expressed as weight per 100 parts by weight rubber. For example, where the triallylcyanurate coagent is employed, the amount employed can include from about 0.25 phr to about 20 phr, and optionally from about 0.5 phr to about 10 phr, based on 100 parts by weight rubber.

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 μm, optionally less than 30 μm, optionally less than 10 μm, optionally less than 5 μm, and optionally less than 1 μm. In certain embodiments, at least 50%, optionally at least 60%, and optionally at least 75% of the particles have an average diameter of less than 5 μm, optionally less than 2 μm, and optionally less than 1 μm.

In one embodiment, the thermoplastic vulcanizates of this invention can be used in thermoforming processes. Thermoforming processes include blow molding (including injection blow molding, extrusion blow molding and press blow molding) and injection molding processes. As those skilled in the art appreciate, these thermoforming processes generally include heating a thermoplastic vulcanizate to a temperature that is equal to or in excess of the melt temperature of the thermoplastic vulcanizate to form a pre-form, forming the pre-form within a mold to form a molded part, cooling the molded part to a temperature at or below the crystallization temperature of the thermoplastic vulcanizate, and releasing the molded part from the mold.

For example, where a thermoplastic vulcanizate is injection blow molded, a parison of thermoplastic vulcanizate is formed by being molded onto a steel core pin contained within a hot runner mold known as an injection station. While still hot, the pin and parison are transferred to a blowing station where the parison is blown within a mold. The pin, plus the blown part, is then transferred to another station for ejection. In one or more embodiments, a three station machine is employed. Additional details respecting injection blow molding and extrusion blow molding can be found in THE BEKUM BLOW MOULDING HANDBOOK (Copyright 1989; Tony Whelan).

Another example includes injection molding. Within these processes, a melt of thermoplastic vulcanizate is injected from a reservoir through a runner into a cavity within a closed split mold. The mold cavity defines the shape of the molded part. The molded part is cooled within the mold at a temperature at or below the crystallization temperature of the thermoplastic vulcanizate, and the molded part can subsequently be ejected from the mold.

The thermoplastic vulcanizates of one or more embodiments of this invention are advantageous in thermoforming techniques inasmuch as the crystallization temperature of these thermoplastic vulcanizates is unexpectedly higher than similar thermoplastic vulcanizates that do not include the high viscosity, long-chain branched polyolefin. As a result, the cycle time of the thermoforming processes can be decreased (i.e., more parts can be made per unit time).

The use of the thermoplastic vulcanizates of one or more embodiments of this invention has also unexpectedly provided certain improved extrudates (i.e., formed by extrusion processing). For example, the use of the thermoplastic vulcanizates of one or more embodiments of this invention has unexpectedly provided extrudates having an improved crystallinity profile. This can be extremely advantageous where thick profiles are extruded. Extrudates having a thick profiles are disclosed in U.S. Patent Application Publication No. 2006/0014903, which is incorporated herein by reference for purposes of U.S. patent practice.

In order to demonstrate the practice of the present invention, the following examples have been prepared and tested. The examples should not, however, be viewed as limiting the scope of the invention. The claims will serve to define the invention.

EXAMPLES

Sample 1

A thermoplastic vulcanizate having a 40 Shore D hardness was prepared in a twin screw extruder by using procedures generally set forth in U.S. Pat. No. 4,594,390. The following ingredients were used: 190 parts by weight of an oil-extended olefinic elastomeric copolymer (this amount includes 100 parts by weight rubber and 90 parts by weight oil), 220 parts by weight linear thermoplastic polypropylene homopolymer, 135 total parts by weight paraffinic oil (130 parts including the go parts inclusive with the rubber), 42 parts by weight clay, 1.94 parts by weight zinc oxide, and 3.4 part by weight wax, 19 parts by weight carbon black/polypropylene concentrate (7.6 parts carbon black and 11.4 parts polypropylene), 1.2 parts by weight stannous chloride, and 7.0 parts by weight phenolic resin, each based on 100 parts by weight of the elastomeric copolymer.

The oil-extended elastomeric copolymer was poly(ethylene-co-propylene-co-5-ethylidene-2-norbornene) having a Mooney Viscosity ($ML_{1+4}$@125° C. per ASTM D-1646) of about 53, an ethylene content of about 66%, and an ethylidene-2-norbornene content of about 4.4%, the thermoplastic polypropylene homopolymer was obtained under the tradename EQUISTAR 51S07A (now F008F (Sunoco)), the carbon black/polypropylene blend was obtained under the tradename AMPACET™ 49974 (Ampacet), and the phenolic resin was obtained under the tradename SP-1045.

Sample 2

A thermoplastic vulcanizate having a 50 Shore D hardness was prepared in a twin-screw extruder by using procedures generally set forth in U.S. Pat. No. 4,594,390. The following ingredients were used: 190 parts by weight of an oil-extended olefinic elastomeric copolymer (this amount includes 100 parts by weight rubber and 90 parts by weight oil), 400 parts by weight linear thermoplastic polypropylene homopolymer, 135 total parts by weight paraffinic oil (130 parts including the 90 parts inclusive with the rubber), 42 parts by weight clay, 1.94 parts by weight zinc oxide, and 3.4 part by weight wax, 19 parts by weight carbon black/polypropylene concentrate (7.6 parts carbon black and 11.44 parts polypropylene) 1.2 parts by weight stannous chloride, and 7.0 parts by weight phenolic resin, each based on 100 parts by weight of the elastomeric copolymer. The ingredients were similar to those in Sample 1.

Sample 3

A long-chain branched polypropylene-α,ω-diene copolymer was prepared in accordance with U.S. Pat. Nos. 6,433,090 and 6,780,936. The long-chain branched copolymer was characterized by a number average molecular weight of 62,932, a weight average molecular weight of 237,068, a Z-average molecular weight of 571,027, an $M_w/M_n$ of 3.77, an $M_z/M_w$ of 2.41, a $<g>_w$ of 0.49, a $<g>_z$ of 0.65, a $T_m$ of 152.2° C., a $T_c$ of 107.7° C., an MFR (230° C. at 2.16 kg load) of 4.8 dg/min, and a diene content of 300 ppm.

Samples 4-6

Portions of the thermoplastic vulcanizate composition of Sample 2 was employed to prepare three additional samples by mixing with the long-chain branched copolymer of Sample 3 in the weight percentages set forth in Table I. The long-chain branched copolymer and the thermoplastic vulcanizate were mixed within a Brabender mixer at a temperature of about 185° C. The samples were then subsequently analyzed for melt temperature ($T_m$) and recrystallization temperature ($T_c$). This analysis was conducted on a Differential Scanning Calorimeter at 10° C. in nitrogen. In order to assure accuracy, two readings were taken for each sample. The results of this testing is set forth in Table I. $\Delta H_f$ refers to heat of fusion and $\Delta H_m$ refers to heat of crystallization; the heat of fusion is determined based upon the area under the melting curve, and heat of crystallization is determined based upon the area under the cooling curve.

TABLE I

| Sample No. | 4 | 5 | 6 |
|---|---|---|---|
| Blend (wt %) | | | |
| Thermoplastic Vulcanizate (Sample No. 2) | 100 | 98.42 | 96.85 |
| Long-Chain Branched Copolymer (Sample No. 3) | — | 1.58 | 3.15 |
| Properties | | | |
| First Melt $T_m$ (° C.) | 161.0 | 161.0 | 160.3 |
| First $\Delta H_f$ (J/g) | 55.9 | 60.1 | 57.0 |
| Second Melt $T_m$ (° C.) | 159.5 | 159.8 | 159.0 |
| Second $\Delta H_m$ (J/g) | 60.0 | 62.2 | 62.3 |
| First Recrystallization $T_c$ (° C.) | 110.6 | 112.4 | 113.5 |
| First $\Delta H_c$ (J/g) | 56.3 | 60.0 | 58.8 |
| Second Recrystallization $T_c$ (° C.) | 110.6 | 112.5 | 113.7 |
| Second $\Delta H_c$ (J/g) | 57.2 | 59.4 | 60.1 |

The date in Table I shows that the crystallization temperature of the thermoplastic vulcanizate increases with the addition of the long-chain branched copolymer of Sample 3. The improvement, however, is notably small.

Samples 7-15

In a similar fashion to Samples 4-6, portions of the thermoplastic vulcanizate composition of Sample 1 were employed to create four samples that were modified by the addition of a high viscosity, long-chain branched polypropylene homopolymer and/or a linear polypropylene homopolymer. In addition to the high viscosity, long-chain branched homopolymer, linear polypropylene polymer was added to increase the hardness of the resulting thermoplastic vulcanizate. The high viscosity, long-chain branched polypropylene homopolymer and the linear polypropylene homopolymer were combined with the thermoplastic vulcanizate by using a Brabender mixer at 185° C. for Samples 7-10. For Samples 11-15, they were mixed by employing a twin screw extruder.

The weight percent of each of the constituents employed in each sample is set forth in Table II. The high viscosity, long-chain branched polypropylene homopolymer was obtained under the tradename PF™ 633 (Montell North America, Inc., now Basell Polyolefins). The high viscosity, long-chain branched polypropylene homopolymer had a melt flow rate of 5.5 dg/min per ASTM-D-1238 at 230° C. and 2.16 kg load, an $M_n$ of 63,400, an $M_w$ of 391,100, an $M_z$ of 1,188,000, an $M_w/M_n$ of 6.17, an $M_z/M_w$ of 3.04, a gN at Mw>1×10$^6$ of less than or equal to 0.50, a $T_m$ of 161.80° C., and a $T_c$ of 129.93° C. It is believed that this high viscosity, long-chain branched polymer was prepared by post-synthesis treatment of an otherwise linear polymer. The linear polypropylene homopolymer had an MFR of 0.7 dg/min and was obtained under the tradename EQUISTAR™ 51S7A now F008F (Sunoco).

The samples were subjected to testing similar to Samples 4-6, and the results are set forth in Table II.

TABLE II

| Sample No. | 7 | 8 | 9 | 10 | 11 |
|---|---|---|---|---|---|
| Blend (wt %) | | | | | |
| Thermoplastic Vulcanizate Sample No. 1 | 85.9 | 85.9 | 85.9 | 85.9 | 85.9 |
| High Viscosity, Long-Chain Branched Copolymer (PF6$_{33}$ ™) | — | 1.1 | 2.1 | 4.2 | — |
| Linear Polypropylene Homopolymer Properties | 14.1 | 13.0 | 12.0 | 9.9 | 14.1 |
| Second Recrystallization $T_c$ (° C.) | 109.6 | 113.5 | 115.2 | 115.0 | 109.2 |

| Sample No. | 12 | 13 | 14 | 15 |
|---|---|---|---|---|
| Blend (wt %) | | | | |
| Thermoplastic Vulcanizate Sample No. 1 | 85.9 | 85.9 | 85.9 | 85.9 |
| High Viscosity, Long-Chain Branched Copolymer (PF6$_{33}$ ™) | 2.1 | 4.2 | 8.4 | 14.1 |
| Linear Polypropylene Homopolymer Properties | 12.0 | 9.9 | 5.7 | 0.0 |
| Second Recrystallization $T_c$ (° C.) | 115.2 | 114.2 | 115.4 | 116.0 |

The data in Table II shows that the addition of high viscosity, long-chain branched polymer increased the crystallization temperature of the thermoplastic vulcanizate. The increase in $T_c$ is technologically significant as compared to Samples 5 and 6.

Samples 16-20

Thermoplastic vulcanizate compositions were prepared in a similar fashion to Sample 1 except that a high viscosity, long-chain branched polymer long-chain branched polypropylene homopolymer (that obtained under the tradename PF633™) was present during dynamic vulcanization. Specifically, 11 parts by weight, per 100 parts by weight rubber, were present during manufacture of Sample 17, and 22 parts by weight, per 100 parts by weight rubber, were present during manufacture of Sample 18. In an attempt to increase the hardness of the thermoplastic vulcanizates, 23.92 parts by weight of linear polypropylene (obtained under the tradename 51SO7A™) was added to Samples 17 and 18 to form Samples 19 and 20, respectively.

Samples 16-20 were subjected to similar analysis as the previous samples and the results thereof are set forth in Table III.

TABLE III

| Sample No. | 16 | 17 | 18 | 19 | 20 |
|---|---|---|---|---|---|
| Blend (wt %) | | | | | |
| Thermoplastic Vulcanizate Sample No. 1 | 100 | 97.9 | 95.8 | 74.50 | 71.93 |
| High Viscosity, Long-Chain Branched (PF$_{33}$ ™) | — | 2.1 | 4.2 | 1.58 | 3.15 |
| Linear Polypropylene Homopolymer | — | — | — | 23.92 | 23.92 |
| Properties | | | | | |
| Second Recrystallization T$_c$ (° C.) | 109.8 | 119.6 | 119.1 | 120.8 | 120.6 |

As with the previous samples, the data in Table III shows that the addition of the high viscosity, long-chain branched polymer increases the crystallization temperature of the thermoplastic vulcanizate. The degree of increase was particularly advantageous and unexpectedly high. It is believed that the presence of the high viscosity, long-chain branched polymer during dynamic vulcanization can lead to an unexpected benefit.

Samples 21-25

Five additional samples were prepared in a manner consistent with the samples prepared in Samples 7-15. Namely, a high viscosity, long-chain branched polypropylene homopolymer (obtained under the tradename PF633™) or a long-chain branched copolymer (Sample No. 3) were added to a 40 Shore D thermoplastic vulcanizate (i.e., portions of Sample 1). The high viscosity, long-chain branched polymers and the thermoplastic vulcanizates were mixed within a Brabender mixer at 185° C. The samples were subjected to analysis similar to the previous samples, and the results thereof are set forth in Table IV.

TABLE IV

| Sample No. | 21 | 22 | 23 | 24 | 25 |
|---|---|---|---|---|---|
| Blend (wt %) | | | | | |
| Thermoplastic Vulcanizate Sample No. 1 | 76.08 | 74.5 | 72.93 | 74.5 | 72.93 |
| Long-Chain Branched Copolymer (Sample III) | 0 | 1.58 | 3.15 | — | — |
| High Viscosity, Long-Chain Branched Polyolefin (PF$_{33}$ ™) | 0 | — | — | 1.58 | 3.15 |
| Linear Polypropylene Homopolymer | 23.92 | 23.92 | 23.92 | 23.92 | 23.92 |
| Properties | | | | | |
| First Melt T$_m$ (° C.) | 158.5 | 158.9 | 158.9 | 158.6 | 158.3 |
| First ΔH$_f$ (J/g) | 57.7 | 56.7 | 58.7 | 57.0 | 57.0 |
| Second Melt T$_m$ (° C.) | 158.3 | 158.3 | 158.5 | 159.1 | 159.0 |
| Second ΔH$_m$ (J/g) | 60.2 | 61.0 | 61.6 | 61.9 | 63.1 |
| First Recrystallization T$_c$ (° C.) | 114.5 | 114.7 | 114.8 | 117.5 | 118.4 |
| First ΔH$_c$ (J/g) | 57.5 | 58.3 | 57.8 | 58.5 | 58.1 |
| Second Recrystallization T$_c$ (° C.) | 114.0 | 114.4 | 114.5 | 117.2 | 118.2 |
| Second ΔH$_c$ (J/g) | 56.9 | 57.8 | 58.3 | 57.9 | 56.8 |

The data in Table IV establishes that high viscosity, long-chain branched homopolymer, which was prepared by post treatment of a linear polyolefin (i.e., polypropylene), significantly outperforms other long-chain branched polymers, such as those of Sample 3, which was made by copolymerization of polyolefin and α,ω-diene monomer. Specifically, the high viscosity, long-chain branched polyolefin advantageously increased the crystallization temperature by a technologically useful amount, whereas the other long-chain branched copolymers insignificantly increased (if at all) the crystallization temperature.

Various modifications and alterations that do not depart from the scope and spirit of this invention will become apparent to those skilled in the art. This invention is not to be duly limited to the illustrative embodiments set forth herein.

What is claimed is:

1. A thermoplastic vulcanizate including:
   i. a cured rubber, where the rubber is cured to an extent where not more than 3 wt % of the rubber within the thermoplastic vulcanizate is extractable in cyclohexane at 23° C., and where the rubber is a copolymer of ethylene, propylene, and a diene; and
   ii. from about 20 to about 400 parts by weight of a thermoplastic resin component per 100 parts by weight rubber;
   where said thermoplastic resin component includes at least 0.1 percent by weight and less than 4.5 percent by weight, based upon the entire weight of said thermoplastic resin component, of a high-viscosity, long-chain branched polypropylene homopolymer that is devoid of α,ω-diene units characterized by
   a melt flow rate of less than 10 dg/min,
   an M$_w$ in excess of 300,000,
   M$_w$/M$_n$ in excess of 4.0, and
   a viscosity average branching index, <gN>$_{vis}$, of less than 0.7,
   where the balance of the thermoplastic resin component includes isotactic polypropylene but excludes a crystallization agent, where the rubber is dynamically cured in the presence of the high-viscosity, long-chain branched polypropylene homopolymer and the isotactic polypropylene, and where the thermoplastic vulcanizate exhibits a second recrystallization temperature, as determined by differential scanning calorimetry at 10° C. in nitrogen, that is at least 8.47% greater than a similar thermoplastic vulcanizate that includes isotactic polypropylene as the entire thermoplastic resin component.

2. The thermoplastic vulcanizate of claim 1, where said high-viscosity, long-chain branched polypropylene homopolymer is characterized by a melt flow rate of less than 2 dg/min, and Mw in excess of 350,000, and M$_z$ in excess of 800,000, M$_w$/M$_n$ in excess of 5.0, and an M$_z$/M$_w$ in excess of 2.7.

3. The thermoplastic vulcanizate of claim 1, where said high-viscosity, long-chain branched polypropylene homopolymer is characterized by a melt flow rate of less than 1 dg/min, and $M_w$ in excess of 375,000, and $M_z$ in excess of 1,000,000, $M_w/M_n$ in excess of 6.0, and an $M_z/M_w$ in excess of 3.0.

4. The thermoplastic vulcanizate of claim 1, where said thermoplastic resin component includes at least 1% by weight and less than 4.5% high-viscosity, by weight, based upon the entire weight of said thermoplastic resin, of said long-chain branch polypropylene homopolymer.

5. The thermoplastic vulcanizate of claim 1, where said high-viscosity, long-chain branched polypropylene homopolymer is characterized by having a viscosity average branching index, $<gN>_{vis}$, of less than 0.5.

6. The thermoplastic vulcanizate of claim 1, where said long-chain branch polyolefin is devoid of polymers or copolymers deriving from the polymerization of $\alpha,\omega$-dienes.

7. An article prepared from the thermoplastic vulcanizate of claim 1, where said article if formed by injection molding or by blow molding.

8. A thermoformed article comprising a thermoplastic vulcanizate including:
   i. a cured rubber, where the rubber is cured with a phenolic resin curing system; and
   ii. from about 20 to about 400 parts by weight of a thermoplastic resin component per 100 parts by weight rubber;
   where said thermoplastic resin component includes at least 0.1 percent by weight and less than 4.5 percent by weight, based upon the entire weight of said thermoplastic resin component, of a high-viscosity, long-chain branched polypropylene homopolymer that is devoid of $\alpha,\omega$-diene units characterized by
      a melt flow rate of less than 10 dg/min,
      an $M_w$ in excess of 300,000,
      an $M_z$ in excess of 700,000,
      $M_w/M_n$ in excess of 4.0,
      an $M_z/M_w$ in excess of 2.5, and
      a viscosity average branching index, $<gN>_{vis}$, of less than 0.7,
   where the balance of the thermoplastic resin component includes isotactic polypropylene but excludes a crystallization agent.

9. A thermoformed article prepared from a thermoplastic vulcanizate comprising:
   i. a cured rubber, where the rubber is cured to an extent where not more than 3 wt % of the rubber within the thermoplastic vulcanizate is extractable in cyclohexane at 23° C.;
   ii. from about 20 to about 400 parts by weight of a thermoplastic resin component per 100 parts by weight rubber;
   where said thermoplastic resin component includes at least 0.1 percent by weight and less than 4.5 percent by weight, based upon the entire weight of said thermoplastic resin component, of a high-viscosity, long-chain branched polypropylene homopolymer that is devoid of $\alpha,\omega$-diene units characterized by
      a melt flow rate of less than 8 dg/min,
      an $M_w$ in excess of 300,000,
      $M_w/M_n$ in excess of 4.0, and
      a viscosity average branching index, $<gN>_{vis}$, of less than 0.7,
   where the balance of the thermoplastic resin component includes isotactic polypropylene but excludes a crystallization agent; and
   where said article is formed by injection molding or by blow molding.

10. The thermoformed article of claim 8, where the rubber is cured to an extent where not more than 3 wt % of the rubber within the thermoplastic vulcanizate is extractable in cyclohexane at 23° C.

11. The thermoformed article of claim 9, where the rubber is cured with a phenolic resin curing system.

12. The thermoplastic vulcanizate of claim 1, where the thermoplastic vulcanizate includes from about 80 to about 200 parts by weight thermoplastic resin per 100 parts by weight rubber.

13. The thermoformed article of claim 8, wherein said thermoplastic resin component includes less than 4.0 percent by weight, based upon the entire weight of said thermoplastic resin, of a high-viscosity, long-chain branched polypropylene homopolymer.

14. The thermoplastic vulcanizate of claim 1, where said thermoplastic vulcanizate includes at least 1.1 percent by weight and less than 4.2 percent by weight, based upon the entire weight of said thermoplastic vulcanizate, of a high-viscosity, long-chain branched polypropylene homopolymer that is devoid of $\alpha,\omega$-diene units.

15. The thermoformed article of claim 8, where said thermoplastic vulcanizate includes at least 1.1 percent by weight and less than 4.2 percent by weight, based upon the entire weight of said thermoplastic vulcanizate, of a high-viscosity, long-chain branched polypropylene homopolymer that is devoid of $\alpha,\omega$-diene units.

16. The thermoformed article of claim 1, where the thermoplastic vulcanizate includes from about 80 to about 400 parts by weight of the thermoplastic resin component per 100 parts by weight of the rubber.

* * * * *